(12) United States Patent
Sun et al.

(10) Patent No.: US 12,472,371 B2
(45) Date of Patent: *Nov. 18, 2025

(54) LED THERAPEUTIC DEVICE

(71) Applicant: Oral IQ LLC, Los Angeles, CA (US)

(72) Inventors: Grace Sun, Los Angeles, CA (US); Hans Kristian Skjorshammer, Los Angeles, CA (US)

( * ) Notice: Subject to any disclaimer, the term of this patent is extended or adjusted under 35 U.S.C. 154(b) by 649 days.

This patent is subject to a terminal disclaimer.

(21) Appl. No.: 17/853,683

(22) Filed: Jun. 29, 2022

(65) Prior Publication Data
US 2023/0097981 A1  Mar. 30, 2023

Related U.S. Application Data

(63) Continuation-in-part of application No. 17/485,224, filed on Sep. 24, 2021, now Pat. No. 12,280,270.

(51) Int. Cl.
*A61N 5/06* (2006.01)

(52) U.S. Cl.
CPC ........ *A61N 5/06* (2013.01); *A61N 2005/0644* (2013.01); *A61N 2005/0652* (2013.01); *A61N 2005/0659* (2013.01); *A61N 2005/0663* (2013.01); *A61N 2005/0665* (2013.01)

(58) Field of Classification Search
CPC .............. A61N 5/06; A61N 2005/0644; A61N 2005/0652; A61N 2005/0659; A61N 2005/0663; A61N 2005/0665; A61N 2005/0606; A61N 2005/0607; A61N 5/0613; A61N 2005/0651; A61N 2005/0662

See application file for complete search history.

(56) References Cited

U.S. PATENT DOCUMENTS

| | | | | |
|---|---|---|---|---|
| 5,423,677 A | * | 6/1995 | Brattesani | A61C 19/043 433/29 |
| 2002/0046938 A1 | * | 4/2002 | Donofrio | H01H 9/04 200/302.1 |
| 2008/0051856 A1 | * | 2/2008 | Vizethum | A61N 5/06 607/80 |
| 2008/0208297 A1 | * | 8/2008 | Gertner | A61N 5/0603 607/92 |
| 2009/0088824 A1 | * | 4/2009 | Baird | A61N 5/0617 607/90 |
| 2009/0290608 A1 | * | 11/2009 | Kim | H01S 5/02212 372/36 |
| 2010/0179469 A1 | * | 7/2010 | Hammond | A61N 5/0624 604/20 |

(Continued)

*Primary Examiner* — John R Downey
(74) *Attorney, Agent, or Firm* — Tommy SF Wang; Wang IP Law Group, P.C.

(57) ABSTRACT

The present application discloses a LED therapeutic device comprising a top case, a light assembly, a controller, a switch assembly, a bottom case and a power supply. The light assembly comprises a lens and a LED assembly, wherein the lens is coupled to the top case and the LED assembly comprises three visible light LEDs and two infrared LEDs. Wavelengths of the three visible light LEDs are 470 nm, 630 nm and 660 nm. Wavelengths of the two infrared LEDs are 850 nm and 940 nm. The controller is coupled to the light assembly. The switch assembly is coupled to the controller. The bottom case is removably coupled to the top case. The power supply is electrically coupled to the controller.

14 Claims, 12 Drawing Sheets

(56) References Cited

U.S. PATENT DOCUMENTS

| | | | |
|---|---|---|---|
| 2014/0135798 A1* | 5/2014 | David | A61B 17/54 606/131 |
| 2015/0257828 A1* | 9/2015 | Tankovich | A45D 26/00 604/20 |
| 2022/0313537 A1* | 10/2022 | Shadduck | A61M 35/003 |
| 2023/0099922 A1* | 3/2023 | Sun | A61N 5/0613 607/88 |

* cited by examiner

| Basic Information | | | | | |
|---|---|---|---|---|---|
| Nominal Voltage | 3.6V | Rated Capacity | 2500mAh 9Wh | | |
| Charge Current | 1250mA | Maximum Continuous Charge Current | 2500mA | End Charge Current | 50mA |
| Cut-off Voltage | 2.75V | Maximum Discharge Current | 7500mA | Limited Charge Voltage | 4.2V |

FIG. 5A

| Test | | |
|---|---|---|
| Item | Sample* | Conclusion |
| Altitude Simulation | C1-C5, C6-C10 | Pass |
| Thermal Test | | Pass |
| Vibration | | Pass |
| Shock | | Pass |
| External Short Circuit | | Pass |
| Impact | C11-C15, C16-C20 | Pass |
| Forced Discharged | C21-C30, C31-C40 | Pass |

\* C1-C5: Cells at first cycle in fully charged states;
  C6-C10: Cells after 25 cycles ending in fully charged states;
  C11-C15: Cells at first cycle at 50% of the design rated capacity;
  C16-C20: Cells at 25 cycle at 50% of the design rated capacity;
  C21-C30: Cells at first cycle in fully discharged states;
  C31-C40: Cells after 25 cycles ending in fully discharged states.

FIG. 5B

LED THERAPEUTIC DEVICE

CROSS-REFERENCE TO RELATED APPLICATION

This application claims the priority of non-provisional patent application U.S. Ser. No. 17/485,224 filed Sep. 24, 2021 which is expressly incorporated by reference herein in its entirety.

TECHNICAL FIELD OF THE INVENTION

The present application generally relates to medical devices, and more particularly, to a LED therapeutic device.

BACKGROUND OF THE INVENTION

Currently, people use visible light and/or infrared light therapy units for temporary pain relief and promote physiotherapy efficiency such as muscular recovery and conditioning.

However, such therapy units are commonly heavily constructed, must consume alternated current (plug-in units), require specialty training, are costly and expensive. It is only suitable for clinic and facility usage and is not practical for the general public. Patient may not treat themselves on a daily basis. In addition, it may also cost a lot for frequent therapeutic visit.

Simply put, current technology is not optimized for the modern healthcare procedure and dynamic between patient and medical providers. Machines and devices tend to be bulky, pricy, not user-friendly and outdated.

Therefore, a need remains for a LED therapeutic device to provide a more convenient and user-friendly therapeutic device for general public.

SUMMARY OF THE INVENTION

The present application discloses a LED therapeutic device to provide a more convenient and user-friendly therapeutic device for general public.

The LED therapeutic device comprises a top case, a light assembly, a controller, a switch assembly, a bottom case and a power supply. The light assembly comprises a lens and a LED assembly, wherein the lens is coupled to the top case and the LED assembly comprises at least two visible light LED and at least one infrared LED. The controller is coupled to the light assembly. The switch assembly is coupled to the controller. The bottom case is removably coupled to the top case. The power supply is electrically coupled to the controller.

In various exemplary embodiments, wherein the LED assembly comprises two infrared LEDs. Wavelengths of the two infrared LEDs are 850 nm and 940 nm.

According to an exemplary embodiment of the LED therapeutic device, wherein wavelengths of the at least two visible light LEDs are 470 nm and 630 nm.

According to the other exemplary embodiment, wherein wavelengths of the at least two visible light LEDs are 470 nm and 660 nm.

According to the other exemplary embodiment, wherein the LED assembly comprises three visible light LEDs. Wavelengths of the three visible light LEDs are 470 nm, 630 nm and 660 nm.

In various exemplary embodiments, wherein the light assembly further comprises a reflector and an insulator. The reflector is coupled between the lens and the LED assembly. The insulator is coupled between the reflector and the LED assembly.

In, various exemplary embodiments, wherein top case comprises aluminum.

In various exemplary embodiments, wherein the bottom case comprises aluminum.

In various exemplary embodiments, wherein the controller comprises a circuit control block and a circuit control panel. The circuit control panel is surrounded by the circuit control block.

In various exemplary embodiments, wherein the switch assembly is located inside the top case.

In various exemplary embodiments, wherein the switch assembly comprises a switch board, a button, a switch retainer and a positioning retainer block. The switch board is coupled to the controller. The button is coupled to the switch board. The switch retainer is located between the button and the switch board. The switch board and the switch retainer are surrounded by the positioning retainer block.

In various exemplary embodiments, wherein the power supply comprises a positive anode board, an anode insulation pad, an o-ring, a battery spring, a battery and a battery barrel. The positive anode board is electrically coupled to the controller via the switch assembly. The anode insulation pad is coupled to the positive anode. The positive anode board and the anode insulation pad are surrounded by the O-ring. The battery is coupled between the battery spring and the positive anode board and is surrounded by the battery barrel.

In various exemplary embodiments, wherein the top case comprises a top body and a removable lid.

According to an exemplary embodiment of the LED therapeutic device, wherein the LED therapeutic device further comprises a wand attachment, wherein the wand attachment is coupled to the top body after removing the removable lid from the top body.

According to the other exemplary embodiment, wherein the LED therapeutic device further comprises a rod attachment, wherein the rod attachment is coupled to the top body after removing the removable lid from the top body.

According to the other exemplary embodiment, wherein the LED therapeutic device further comprises a ball attachment, wherein the ball attachment is coupled to the top body after removing the removable lid from the top body.

Based on the above, the LED therapeutic device of the present application provide a portable device with lighter weight by utilize the aluminum as a main material for the top case and the bottom case. As such, patient may use the LED therapeutic device of the present application anywhere they want and on a daily basis.

In addition, the combination of visible light and infrared light may also provide a more therapeutic treatment for the patient. Specifically, compared with other wavelengths, it is evidence-based for the combined-usage of the wavelengths mentioned in the present application to have more clinical efficacy.

Furthermore, the combination of the blue (470 nm) light, the red (630 nm and 660 nm) light and/or the infrared (850 nm and 940 nm) light may also allow the user to utilize the LED therapeutic device of the present application in different modes such as all lights on as the first mode; only red light and infrared light on as the second mode; or only blue light on as the third mode.

The user may also utilize the wand/rod/ball attachments to work with different wavelengths in different applications such as intra-nasal, intra-oral or intra-bodily use. This functionality provides great flexibility and user-friendliness to the individual.

The function of the LED therapeutic device of the present application is unique. It can be used by not only patients themselves but all practicing medical professionals such as dentists, chiropractors, physical therapists etc. for treating a wide range of the patients' symptoms in clinic.

Numerous other advantages and features of the present application will become readily apparent from the following detailed description of disclosed embodiments, from the claims and from the accompanying drawings.

BRIEF DESCRIPTION OF THE DRAWINGS

The objects, features and advantages of the present application will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIGS. 5A-5B show general information and the test result of a battery of the LED therapeutic device.

DETAILED DESCRIPTION OF DISCLOSED EMBODIMENTS

Figure 1:
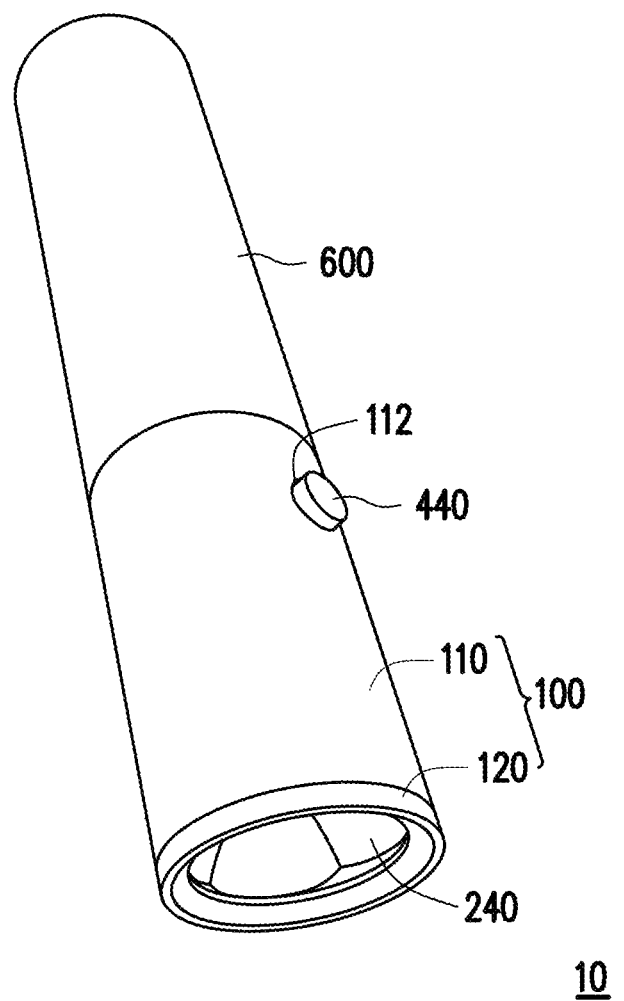
FIG. 1 is a perspective view of a LED therapeutic device.

Reference will now be made in detail to the present representative embodiments of the present application, examples of which are illustrated in the accompanying drawings. Wherever possible, the same reference numbers are used in the drawings and the description to refer to the same or like parts.

Figure 2:
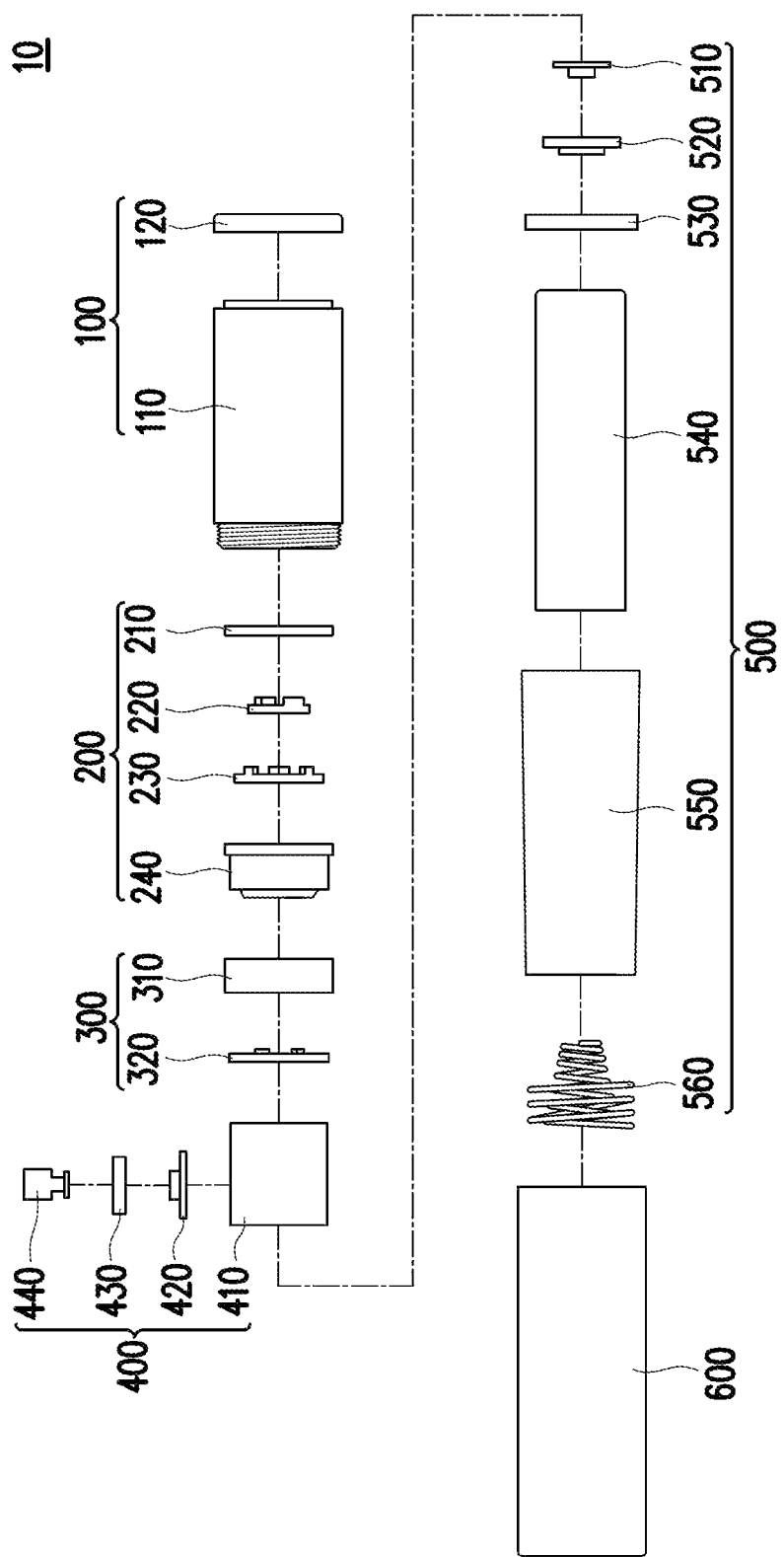
FIG. 2 is an exploded view of the LED therapeutic device.
Figure 3:
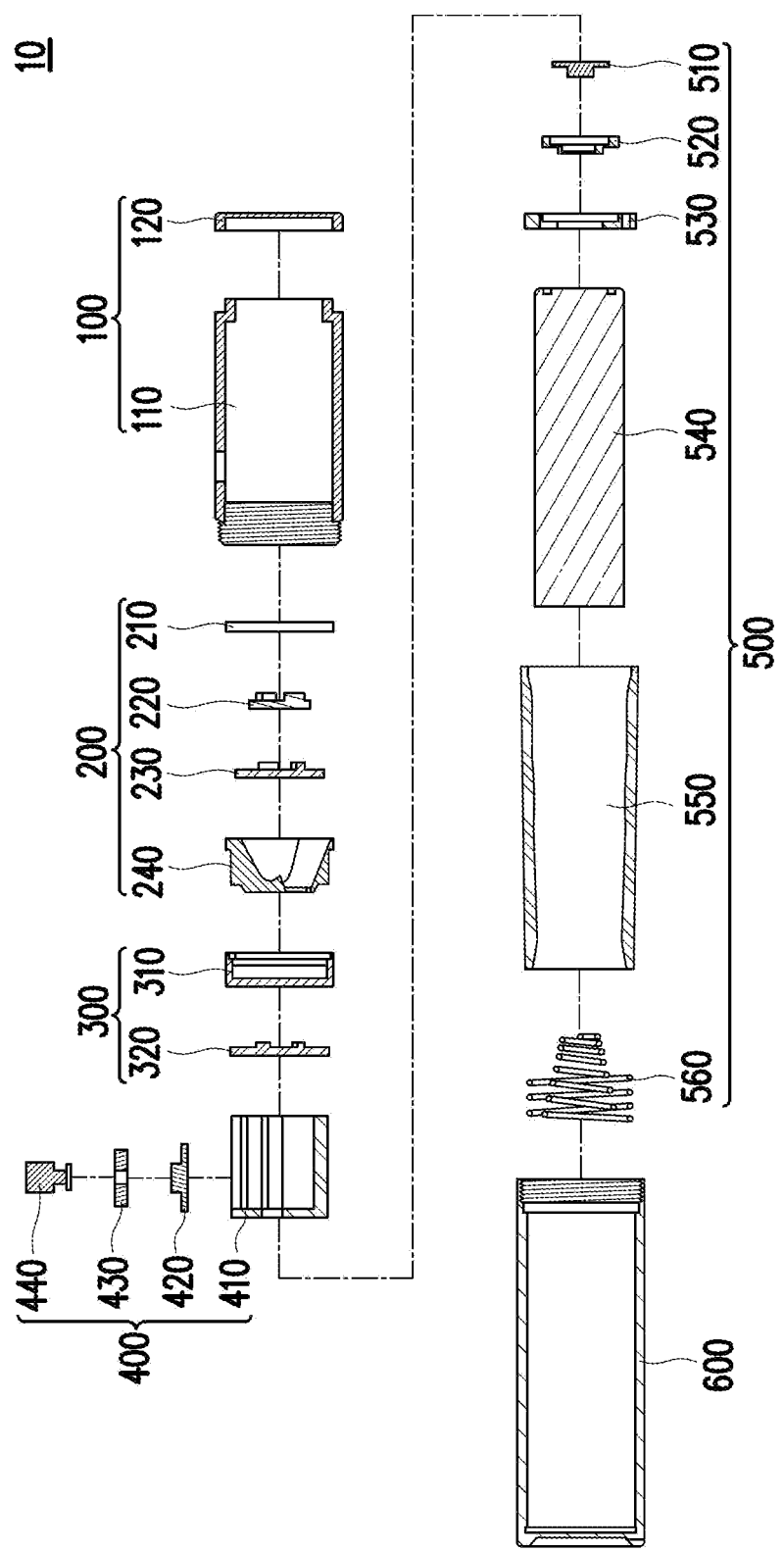
FIG. 3 is a cross-sectional and exploded view of the LED therapeutic device.
Figure 4:
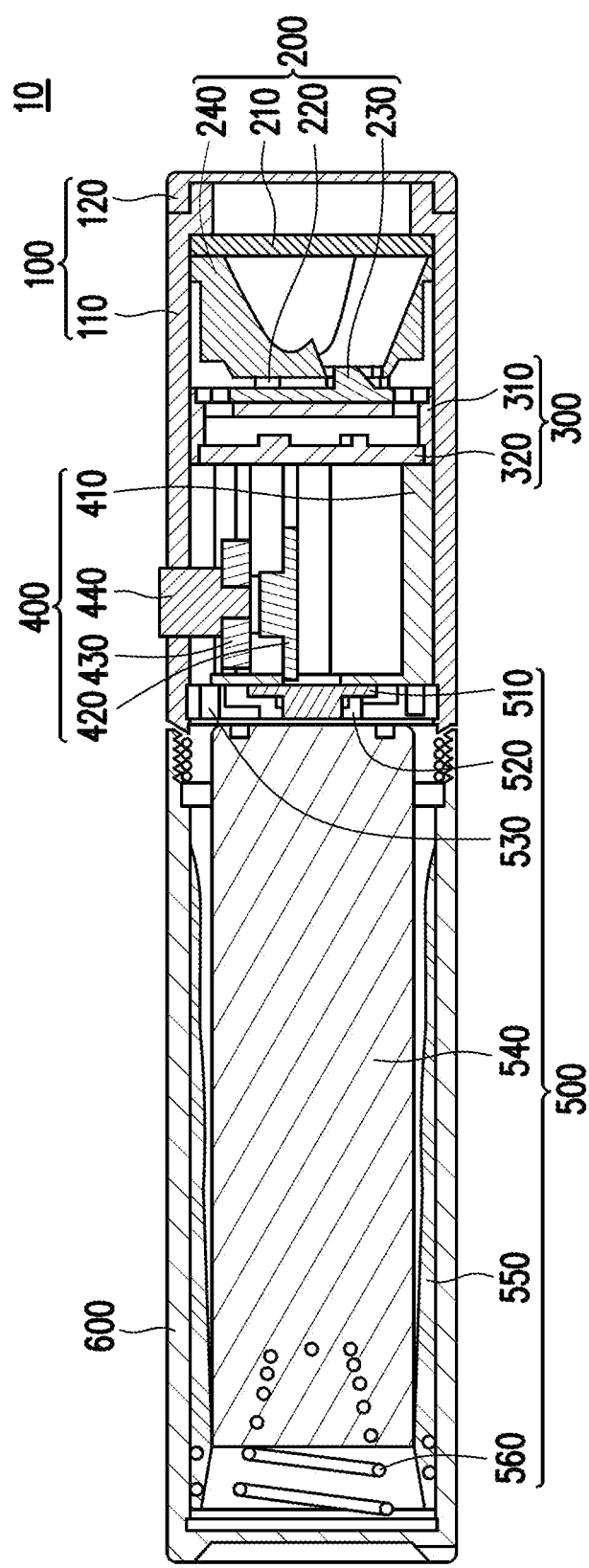
FIG. 4 is a cross-sectional view of the LED therapeutic device.

FIG. 1 is a perspective view of a LED therapeutic device 10. FIG. 2 is an exploded view of the LED therapeutic device 10. FIG. 3 is a cross-sectional and exploded view of the LED therapeutic device 10. FIG. 4 is a cross-sectional view of the LED therapeutic device 10.

Referring to FIGS. 1-4, the LED therapeutic device 10 of the present application comprises a top case 100, a light assembly 200, a controller 300, a switch assembly 400, a power supply 500 and a bottom case 600.

The top case 100 comprises aluminum. More specifically, the top case 100 is made of adonized aluminum. The weight for aluminum case is lighter than stainless steel as shown in current market. In addition, aluminum dissipates heat up to 15 times faster than stainless steel, keeping other components cool. It is ideal for electronic device for better thermal management to improve reliability and safer and more comfortable to use for treatment.

The top case 100 comprises a top body 110 and a removable lid 120. In the present application, the top body 110 is cylindrical as an example but is not limited as long as the light assembly 200, the controller 300 and the switch assembly 400 may be located therein. The removable lid 120 is removably screwed to the top body 110.

The light assembly 200 comprises a lens 210, an insulator 220, a LED assembly 230 and a reflector 240. The lens 210 is coupled to one end of the top case 100 as a clear window for light transmission. The insulator 210 is coupled between the reflector 240 and the LED assembly 230. The insulator also works as a retainer pad to secure the LED assembly 230. The LED assembly 230 of the present application comprises at least two visible light LEDs and at least one infrared LED. More details about the LED assembly 230 will be described later with FIGS. 6A-6C, The reflector 240 is coupled between the lens 210 and the LED assembly 230 for maximize the light output. The external and internal shapes of the reflector 240 are not limited in the present application as long as the reflector 240 could increase the light output.

The controller 300 comprises a circuit control block 310 and a circuit control panel 320, The circuit control panel 320 is surrounded by the circuit control block 310. The circuit control panel 320 of the controller 300 is electrically coupled to the light assembly 200 to control the light.

The switch assembly 400 is located inside the top case 100 in the present application but is not limited thereto as long as the user could turn on/off the LED therapeutic device 10 by the switch assembly 400. The switch assembly 400 comprises a positioning retainer block 410, a switch board 420, a switch retainer 430 and a button 440. The positioning retainer block 410 secures the other components of the switch assembly 400. Specifically, the switch board 420, the switch retainer 430 and part of the button 440 are surrounded by the positioning retainer block 410. The switch board 420 is electrically coupled to the controller 300. The switch retainer 430 is located between the button 440 and the switch board 420 to secure the connection between the button 440 and the switch board 420. The button 440 is coupled to the switch board 420. The button 400 is partially located inside the positioning retainer block 410 and partially protruded outside the top case 100. Specifically, as shown in FIG. 1, the top body 110 comprises a hole 112. Part of the button 400 is protruded outside the top body 110 via the hole 112, allowing the user to press the button 440 to turn on/off the LED therapeutic device 10. The shapes of the button 440 and the hole 112 are not limited in the present application as long as the user may turn on/off the LED therapeutic device 10 via the button 440.

The power supply 500 is electrically coupled to the controller 300. Specifically, the power supply 500 comprises a positive anode board 510, an anode insulation 520, an o-ring 530, a battery 540, a battery barrel 550 and a battery spring 560.

The positive anode board 510 is electrically coupled to the controller 300 via the switch assembly 400. The anode insulation pad is coupled to the positive anode 510. The positive anode board 510 and the anode insulation pad 520 are surrounded by the o-ring 530. The positive anode board 510, the anode insulation pad 520 and the o-ring 530 are located inside the top case 100 in the present application as an example but are not limited.

The battery 540 is a rechargeable battery. More specifically, the battery 540 is a high capacity lithium rechargeable battery. FIGS. 5A-5B show general information and the test result of a battery 540 of the LED therapeutic device 10. The rating power in the present application is 15W as an example but is not limited.

However, the battery 540 of LED therapeutic device 10 of the present application is not limited in the above battery. The power supply 500 may also be another kind of power supply such as USB charging or plug-in style as long as the power supply 500 could provide power to the LED therapeutic device 10.

The battery 540 is surrounded by the battery barrel 550. Specifically, the battery barrel 550 is fixed with inner side wall of the bottom case 600 to provide a suitable accommodation size for the battery 540 to prevent battery 540 from moving. The battery spring 560 is fixed with inner bottom of the bottom case 600. The battery 540 is electrically coupled between the battery spring 560 and the positive, anode board 510 to assure better current conduction.

The bottom case 600 comprises aluminum. More specifically, the bottom case 600 is made of adonized aluminum. As mentioned above, the weight for aluminum case is lighter than stainless steel as shown in current market. In addition, aluminum dissipates heat up to 15 times faster than stainless steel, keeping other components cool. In the present application, the bottom case 600 is cylindrical as an example but is not limited as long as the bottom case 600 could be removably coupled to the top case 100.

In the present application, the overall size of the LED therapeutic device 10 is 30 mm in diameter and with 123 mm in length as an example but is not limited. By the above structure, as an example but is not limited, the net weight of the LED therapeutic device 100 including one battery 540 inside is around 0.135 kg. However, if the above-structured LED therapeutic device 10 is modified to be made of stain steel, the net weight would be around 7.4 oz (0.21 kg). It is much lighter to the patient to hold for long time in order to get treatment. Also, aluminum material allows the LED therapeutic device 10 to dissipate heat quickly and effectively. The LED therapeutic device 10 may remain cool during the entire treatment period which leads to an overall better user-experience.

The aluminum material avoids the common problem of overheating, thereby making it more effective and convenient to use than current therapeutic devices. The LED therapeutic device 10 may remain cool in the hand while the user is using and holding it during self-care procedures from home. The portability of the LED therapeutic device 10 also ensures that it also can be used for treating acute pain outside of the home, for travelling and on the go.

In addition, the size of the LED therapeutic device 10 is also suitable for treating and accessing tight spaces and deeper areas such as within the nose and mouth, making it be convenient for intra-oral and intranasal application.

The lifespan of the LED therapeutic device 10 is around 50,000 hours but is not limited. The lifespan may be different based on how users operate the LED therapeutic device 10 and/or usage frequency etc.

Figure 6A:
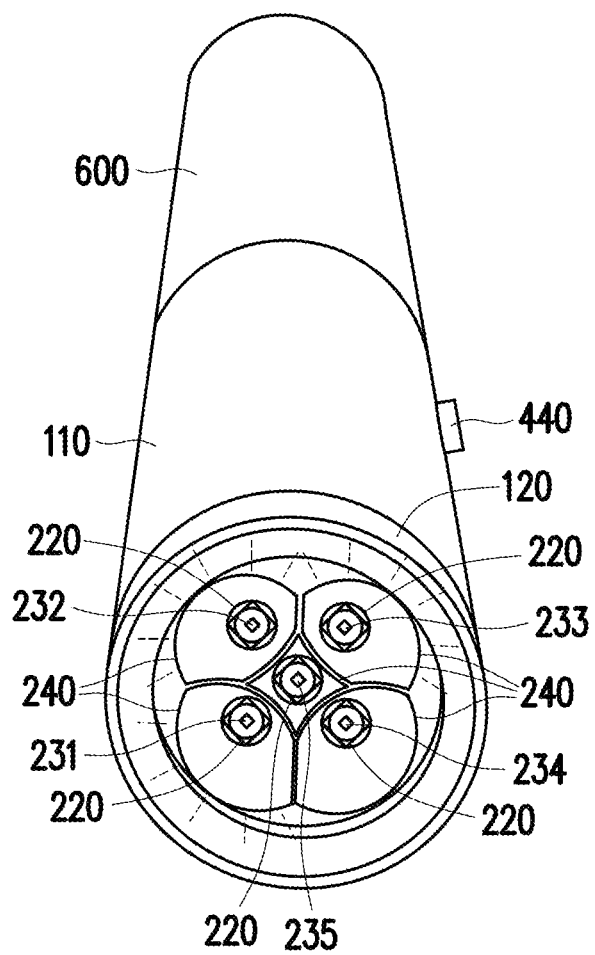
FIG. 6A is another perspective view showing a first embodiment of the LED assembly of the LED therapeutic device.
Figure 6B:
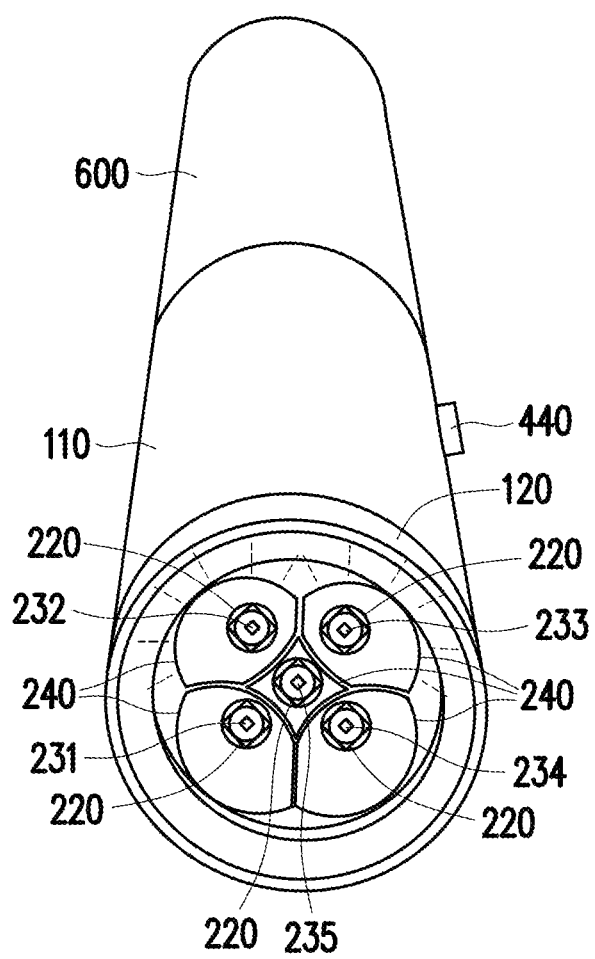
FIG. 6B is the other perspective view showing a second embodiment of the LED assembly of the LED therapeutic device.
Figure 6C:
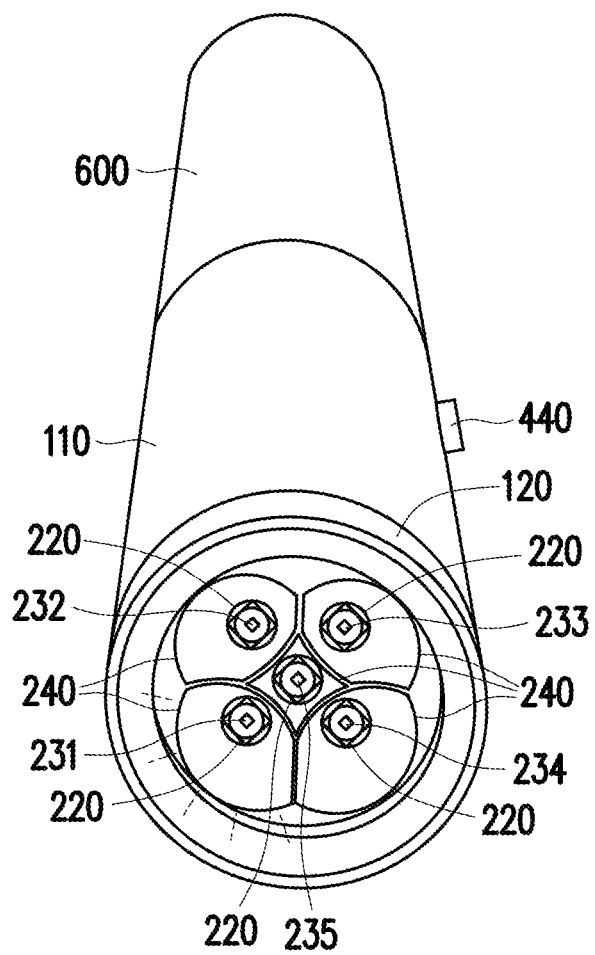
FIG. 6C is the other perspective view showing a third embodiment of the LED assembly of the LED therapeutic device.

FIG. 6A is another perspective view showing a first embodiment of the LED assembly 230 of the LED therapeutic device 10. FIG. 6B is the other perspective view showing a second embodiment of the LED assembly 230 of the LED therapeutic device 10. FIG. 6C is the other perspective view showing a third embodiment of the LED assembly 230 of the LED therapeutic device 10.

As shown in FIGS. 6A-6C, the LED assembly 230 of the LED therapeutic device 10 of the present application comprises at least two visible light LEDs and at least one infrared LED. Specifically, the LED assembly 230 comprises five LEDs 231/232/233/234/235, wherein there are three visible light LEDs 231/232/233 and two infrared LEDs 234/235. Specifically, a wavelength of the visible light LED 231 is 470 nm, showing blue light when turning on; a wavelength of the visible light LED 232 is 630 nm, showing red light when turning on; a wavelength of the visible light LED 233 is 660 nm, showing red light when turning on; a wavelength of the infrared LED 234 is 850 nm; and a wavelength of the infrared LED 235 is 940 nm.

The wavelengths of the visible light LEDs 231/232/233 and the infrared LEDs 234/235 are chosen from ideal light intensity for biological effects anywhere on the body and are evidence-based. The light-combination of the present application makes it ideal for many different applications such as cosmetic application, soft tissue healing and deep penetration into the structure of the bone, nerve and ligaments etc. It is suggested to protect eyes such as wearing protective glasses when using the LED therapeutic device 10 of the present application.

The layout of the visible light LEDs and the infrared LEDs may be changed. For example, the location of the visible light LED 231 may be exchanged with the location of the infrared LED 234; the location of the visible light LED 232 may be exchanged with the location, of the visible light LED 233 etc. In other words, any of the LED of the LED assembly 230 may be disposed at any of the locations between current locations of the visible light LEDs 231/232/233 or the infrared LEDs 234/235.

As shown in FIGS. 6A-6C, the LED therapeutic device 10 of the present application comprises three different modes as an example but is not limited.

FIG. 6A shows the first mode as all of the visible light LEDs 231/232/233 and the infrared LEDs 234/235 are turned on. As such, the visible light LED 231 shows blue light; the visible light LEDs 232/233 show red light; and the infrared LEDs 234/235 are invisible to the human eye. During the first mode, the actual output is 5.52 W and the irradiation is over 120 mW/cm$^2$ at 1 inch distance.

The first mode of the LED therapeutic device 10 of the present application may promote wound healing etc.

FIG. 6B shows the second mode as only the visible light LEDs 232/233 and the infrared LED 234/234 are turned on. As such, the visible light LED 231 is not shinning; the visible light LEDs 232/233 show red light; and the infrared LEDs 234/235 are invisible to the human eye. During the second mode, the actual output is 3.7 W.

The second mode of the LED therapeutic device 10 of the present application may temporary relief of minor muscle and joints pain, arthritis and muscle spasm promote circulation; reduce inflammation; stimulate collagen production; smooth fine lines and wrinkles; enhance tissue regeneration; reduce swelling etc.

FIG. 6C shows the third mode as only the visible light LED 231 is turned on. As such, the visible light LED 231 shows blue light; the visible light LEDs 232/233 are not shinning; and the infrared LEDs 234/235 are not shinning. During the third mode, the actual output is 1.56 W.

The third mode of the LED therapeutic device 10 of the present application may prevent skin breakout or infection by suppressing bacteria; enhance efficiency for teeth whitening etc.

The timer set for the LED therapeutic device 10 for different mode is 3 minutes as an example but is not limited. Specifically, it is suggested for general users to treat the treatment area by the LED therapeutic device 10 of the present application for 3 minutes in each time. For dosage, treating per treatment area 1 time/day by the LED therapeutic device 10 for the patient with light pain; treating per treatment area 2-3 times/day by the LED therapeutic device 10 for the patient with average pain; treating per treatment area 3 times/day by the LED therapeutic device 10 for the patient with deep pain. However, the above dosage and timer are not limited depending on different conditions.

In addition, it is also suggested for general users to hold the LED therapeutic device 10 of the present application over the treatment area at a distance anywhere from contacting directly to the skin. However, the present application is not limited. The LED therapeutic device 10 may be differently used case-by-case, depending on the patients' condition.

Figure 7A:
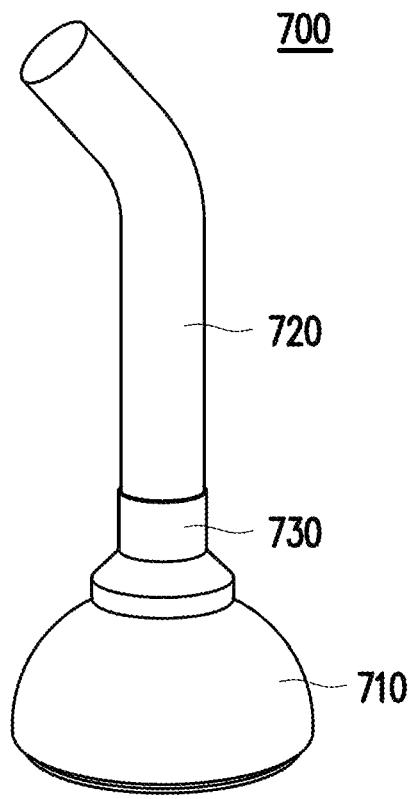
FIGS. 7A-7B show a first embodiment of the LED therapeutic device with a wand attachment.
Figure 7B:
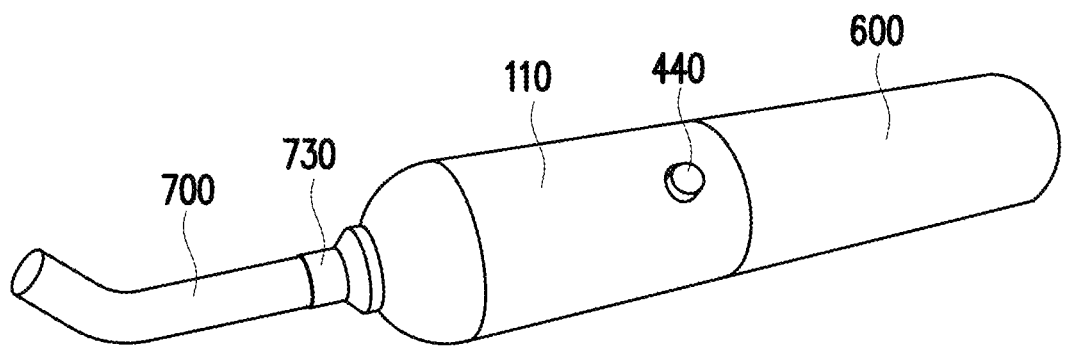

FIGS. 7A-7B show a first embodiment of the LED therapeutic device 10 with a wand attachment 700.

Referring to FIGS. 7A-7B, the wand attachment 700 comprises an attachment base 710, a wand head 720 and a sheath 730. The wand attachment 700 is coupled to the top body 110 after removing the removable lid 120 (referring to FIG. 1) from the top body 110. In the present application, the attachment base 710 is screwed to the top body 110 but is not limited as long as the attachment base 710 may be coupled stably to the top body 110. The wand head 720 is coupled to the attachment base 710 by inserting into the sheath 730 which is coupled to the attachment base 710.

The dimensions of the wand attachment 700 with optical coating are: 8 mm in diameter of the wand head 720; 5.5 cm length of the wand head 720 from the sheath 730 between the attachment base; 7.0 cm, length from the attachment base 710; 8.5 cm bare fug length. The above dimensions of the wand attachment 700 is only as an example but is not limited.

When utilizing the LED therapeutic device 10 with the wand attachment 700, the outputs are: 162 mW/cm2 during the first mode; 154 mWcm2 during the second mode; and 6 mW/cm2 during the third mode. However, the above data is only as an example but is not limited.

The LED therapeutic device 10 with the wand attachment 700 may be used for intra-orally and extra-orally treatments to stimulate tissue healing and bone regeneration within the oral cavity.

Figure 8A:
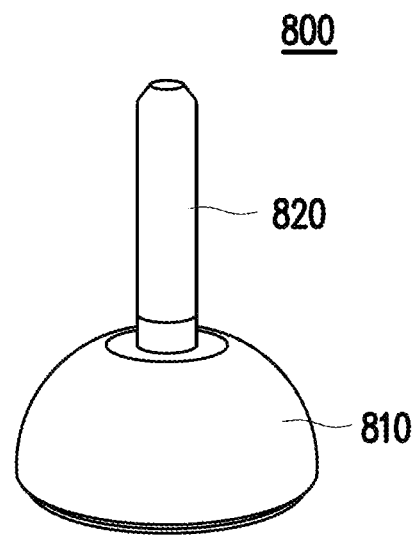
FIGS. 8A-8B show a second embodiment of the LED therapeutic device with a rod attachment.
Figure 8B:
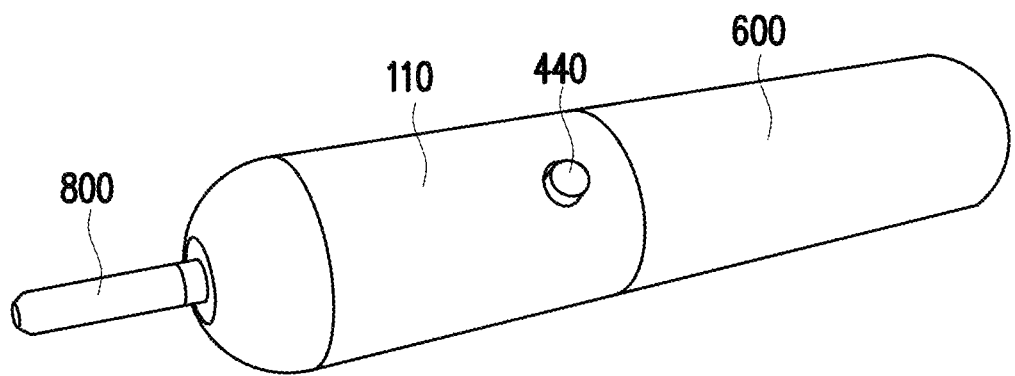

FIGS. 8A-8B show a second embodiment of the LED therapeutic device 10 with a rod attachment 800.

Referring to FIGS. 8A-8B, the rod attachment 800 comprises an attachment base 810 and a rod head 820. The rod attachment 800 is coupled to the top body 110 after removing the removable lid 120 (referring to FIG. 1) from the top body 110. In the present application, the attachment base 810 is screwed to the top body 110 but is not limited as long as the attachment base 810 may be coupled stably to the top body 110. The rod head 820 is inserted into the attachment base 810.

The dimensions of the rod attachment 800 are: 5 mm in diameter of the rod head 820; 3 cm length from the attachment base 810. The above dimensions of the rod attachment 800 is only as an example but is not limited.

When utilizing the LED therapeutic device 10 with the rod attachment 800, the outputs are: 60 mW/cm2 during the first mode; 50 mW/cm2 during the second mode; and 3 mW/cm2 during the third mode. However, the above data is only as an example but is not limited.

The LED therapeutic device 10 with the rod attachment 800 may be used for intranasally treatments such as treating sinusitis in sinus or tinnitus in ears etc.

Figure 9A:
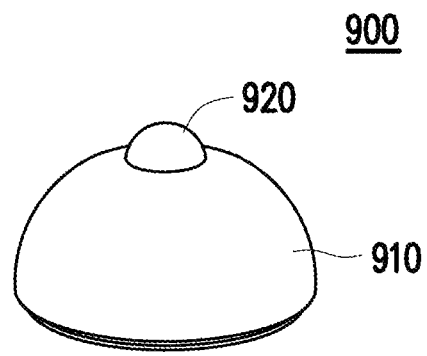
FIGS. 9A-9B show a third embodiment of the LED therapeutic device with a ball attachment.
Figure 9B:
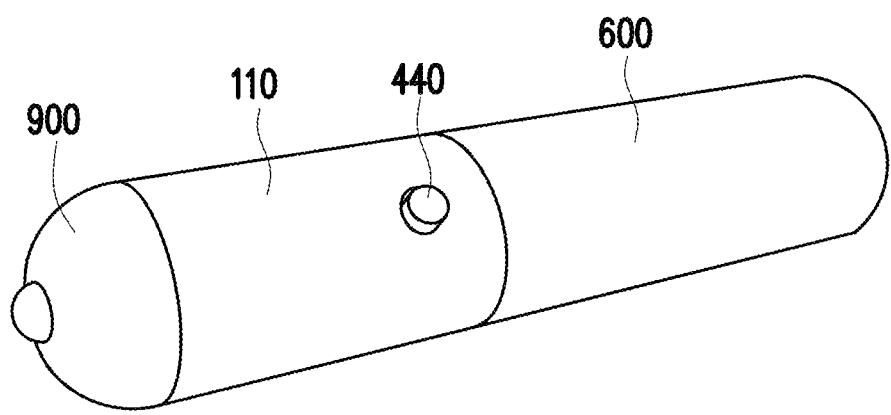

FIGS. 9A-9B show a third embodiment of the LED therapeutic device 10 with a ball attachment 900.

Referring to FIGS. 9A-9B, the ball attachment 900 comprises an attachment base 910 and a ball head 920. The ball attachment 900 is coupled to the top body 110 after removing the removable lid 120 (referring to FIG. 1) from the top body 110. In the present application, the attachment base 910 is screwed to the top body 110 but is not limited as long as the attachment base 910 may be coupled stably to the top body 110.

The ball head 920 is 12 mm in diameter as an example but is not limited.

When utilizing the LED therapeutic device 10 with the ball attachment 900, the outputs are: over 200 mW/cm2 during the first mode; over 200 mW/cm2 during the second mode; and 10 mW/cm2 during the third mode. However, the above data is only as an example but is not limited.

The LED therapeutic device 10 with the ball attachment 900 may be used for bodily treatment to ease tension and loosen up muscle-knots. For example, when doing the acupuncture treatment, the user may treat the meridian points as a treatment area and/or along with Eastern Shiatsu massage technique as a supplement.

Figure 10:
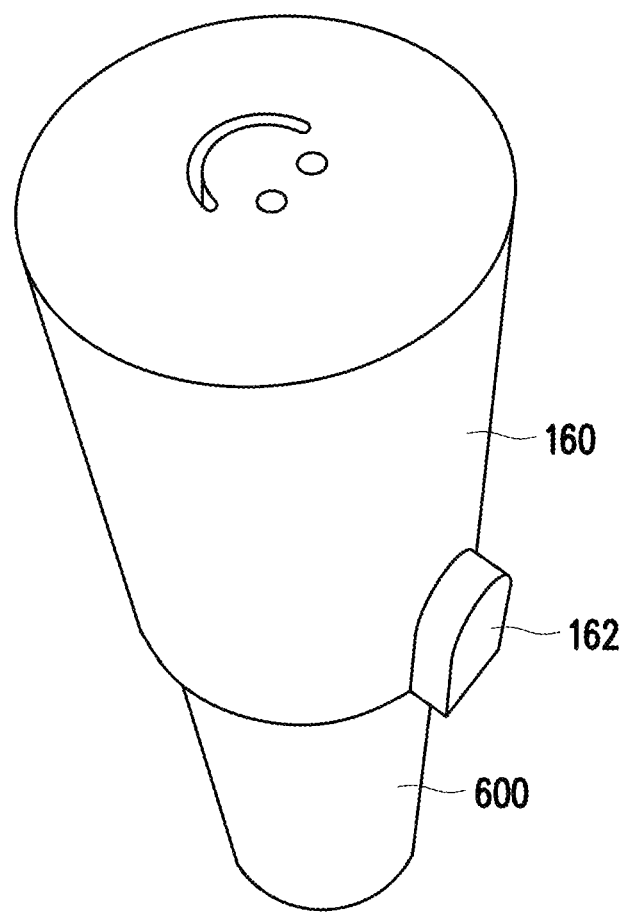
FIG. 10 is the other perspective view showing the LED therapeutic device with a cover.

FIG. 10 is the other perspective view showing the LED therapeutic device with a switch guard 160.

The top case 100 further comprises the switch guard 160 to protect the LED therapeutic device 10. The dimensions of the switch guard 160 are: 3 mm in inner rim diameter; 3.4 cm in outer rim diameter; 5 cm in height. The switch guard 160 comprises a protrusion 162 for protecting the button 440 (referring to FIG. 1). The dimensions of the protrusion 162 are: 1.7 cm long and 4 mm*6 mm configuration. The above dimensions of the rod attachment 800 is only as an example but is not limited. In addition, the switch guard 160 of the present application comprises plastic but is not limited.

Based on the above, the LED therapeutic device of the present application provide a portable device with lighter weight by utilize the aluminum as a main material for the top case and the bottom case. As such, patient may use the LED therapeutic device of the present application anywhere they want and on a daily basis.

In addition, the combination of visible light and infrared light may also provide a more therapeutic treatment for the patient. Specifically, compared with other wavelengths, it is evidence-based for the combined-usage of the wavelengths mentioned in the present application to have more clinical efficacy.

Furthermore, the combination of the blue (470 nm) light, the red (630 nm and 660 nm) light and/or the infrared (850 nm and 940 nm) light may also allow the user to utilize the LED therapeutic device of the present application in different modes such as all lights on as the first mode; only red light and infrared light on as the second mode; or only blue light, on as the third mode.

The user may also utilize the wand/rod/ball attachments to work with different wavelengths in different applications such as intra-nasal, intra-oral or intra-bodily use. This functionality provides great flexibility and user-friendliness to the individual.

The function of the LED therapeutic device of the present application is unique. It can be used by not only patients themselves but all practicing medical professionals such as dentists, chiropractors, physical therapists etc. for treating a wide range of the patients' symptoms in clinic.

It will be apparent to those skilled in the art that various modifications and variations can be made to the structure of the present application without departing from the scope or spirit of the present application. In view of the foregoing, it is intended that the present application cover modifications and variations of this application provided they fall within the scope of the following claims and their equivalents.

What is claimed is:

1. A light emitting diode (LED) therapeutic device, comprising:
    a top case having a first end and a second end opposite to the first end;
    a light assembly embedded in an interior space of the top case and comprising:
        a lens coupled to the first end of the top case;
        a LED assembly close to the lens and comprising three visible light LEDs and two infrared LEDs, wherein the three visible light LEDs have wavelengths of 470 nm, 630 nm, and 660 nm, and the two infrared LEDs have wavelengths of 850 nm and 940 nm; and
        a reflector assembly coupled to the LED assembly and comprising five segments laterally connected to one another and oriented toward the lens, with each of the LEDs disposed in an opening within one of the five segments;
    a controller electrically coupled to the light assembly and configured to control the light assembly to emit an irradiance of 100-140 mW/cm$^2$ when the LED therapeutic device is in contact with skin;
    a switch assembly coupled to the controller;
    a bottom case removable coupled to the second end of the top case; and
    a power supply electrically coupled to the controller and embedded in an interior space of the bottom case.

2. The LED therapeutic device as claimed in claim 1, wherein the light assembly further comprises a reflector coupled between the lens and the LED assembly.

3. The LED therapeutic device as claimed in claim 2, wherein the light assembly further comprises an insulator coupled between the reflector and the LED assembly.

4. The LED therapeutic device as claimed in claim 1, wherein top case comprises aluminum.

5. The LED therapeutic device as claimed in claim 1, wherein the bottom case comprises aluminum.

6. The LED therapeutic device as claimed in claim 1, wherein the controller comprises: a circuit control block; and
    a circuit control panel surrounded by the circuit control block.

7. The LED therapeutic device as claimed in claim 1, wherein the switch assembly is located inside the top case.

8. The LED therapeutic device as claimed in claim 1, wherein the switch assembly comprises:
    a switch board coupled to the controller;
    a button coupled to the switch board; and
    a switch retainer located between the button and the switch board.

9. The LED therapeutic device as claimed in claim 8, wherein the switch assembly further comprises a positioning retainer block, wherein the switch board and the switch retainer are surrounded by the positioning retainer block.

10. The LED therapeutic device as claimed in claim 1, wherein the power supply comprises:
    a positive anode board electrically coupled to the controller via the switch assembly;
    an anode insulation pad coupled to the positive anode;
    an o-ring, wherein the positive anode board and the anode insulation pad are surrounded by the o-ring; a battery spring;
    a battery coupled between the battery spring and the positive anode board; and
    a battery barrel, wherein the battery is surrounded by the battery barrel.

11. The LED therapeutic device as claimed in claim 1, wherein the top case comprises a top body and a removable lid.

12. The LED therapeutic device as claimed in claim 11, further comprising a wand attachment, wherein the wand attachment is coupled to the top body after removing the removable lid from the top body.

13. The LED therapeutic device as claimed in claim 11, further comprising a rod attachment, wherein the rod attachment is coupled to the top body after removing the removable lid from the top body.

14. The LED therapeutic device as claimed in claim 11, further comprising a ball attachment, wherein the ball attachment is coupled to the top body after removing the removable lid from the top body.

* * * * *